UNITED STATES PATENT OFFICE.

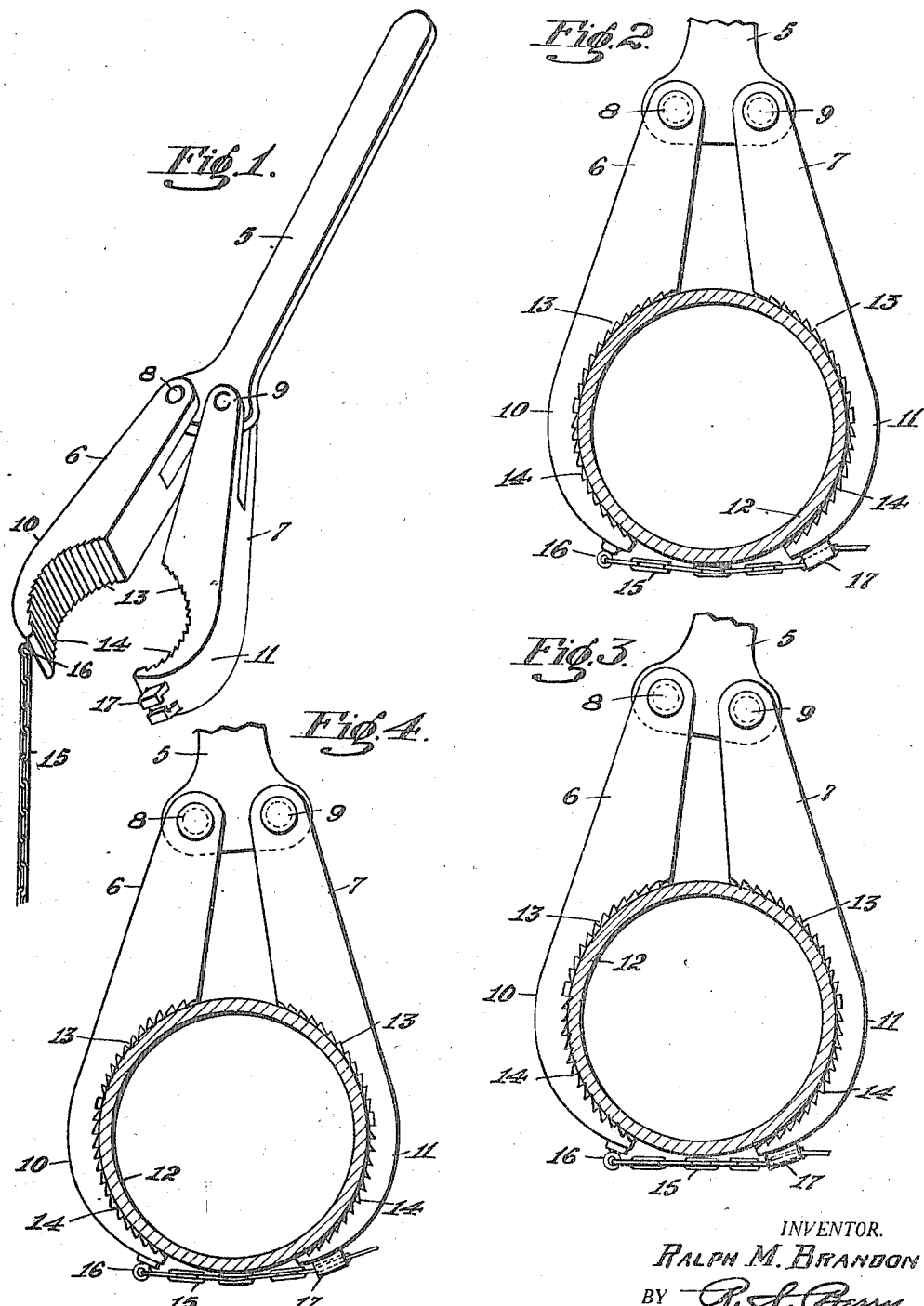

RALPH M. BRANDON, OF LOS ANGELES, CALIFORNIA.

PIPE-TONGS.

1,270,371.  Specification of Letters Patent.  Patented June 25, 1918.

Application filed September 17, 1917. Serial No. 191,863.

*To all whom it may concern:*

Be it known that I, RALPH M. BRANDON, a subject of the King of Great Britain, residing at Los Angeles, in the county of Los Angeles and State of California, have invented new and useful Improvements in Pipe-Tongs, of which the following is a specification.

This invention relates to pipe tongs and particularly pertains to pipe tongs especially adapted for use in connecting and disconnecting threaded pipe sections of large diameters.

It is the object of this invention to provide pipe tongs which may be easily and quickly engaged with and disengaged from a pipe and which are so constructed that when engaged with the pipe may be operated to turn the pipe in either direction without dismounting the tongs. Another object is to provide pipe tongs embodying a pair of jaw members pivoted on a shank having gripping teeth so formed that when the shank is in a central position the tongs may be moved around the pipe in either direction, or longitudinally thereof, without gripping, and when the shank is positioned on either side of the central position, they will grip the pipe so that it may be turned in the direction at which the shank extends. A further object is to provide tongs of the above character by which the pipe may be turned in either direction in a step by step movement by rocking the shank backward and forward on either side of its central position according to the direction in which the pipe is to be turned. Other objects will appear hereinafter.

The invention is illustrated in the accompanying drawings, in which;

Figure 1, is a perspective view of the pipe tongs showing the jaws positioned in readiness to receive a pipe.

Fig. 2, is a view showing the tongs mounted on a pipe with the shank in its central position in which the jaws may be freely moved on the pipe without gripping.

Fig. 3, is a view of the tongs as applied showing the shank disposed to the right of its central position in which the jaws grip the pipe to turn the latter to the right.

Fig. 4, is a similar view showing the shank disposed to the left of its central position in which the jaws are arranged to grip the pipe in turning it to the left.

More specifically 5 indicates the shank which may be of any suitable length and shape, to one end of which a pair of arms 6 and 7 are attached by spaced pivot pins 8 and 9, and which arms are formed with arcuate jaws 10 and 11 adapted to be placed astride of and partly encircling a pipe 12. Each jaw is formed on the opposite sides of its longitudinal center with opposed ratchet teeth 13 and 14, the end faces of which extend substantially radially of the jaws. The teeth 13 extend from near the center of the jaws to a point adjacent to the pivotal mounting thereof with the outer faces of the teeth inclined outwardly away from the pivotal mounting so that the gripping edges of the teeth 13 will bite into the surface of the pipe when the jaws are turned in a direction toward their outer ends. The teeth 14 extend from near the center of the jaws to a point adjacent their outer ends and the outer faces of these teeth slope outwardly toward the pivotal mounting of the jaws and opposite the teeth 13 so as to bite into the pipe when the jaws are moved in a direction away from their outer ends; the teeth 13 and 14, however, not gripping the pipe when the shank is in its central position in which the jaws will be loose on the pipe. The teeth 13 on one jaw and the teeth 14 on the other jaw thus coact in engaging the pipe on diametrically opposite sides thereof according to the direction of pull imposed on the jaws as will be later described. As a means for holding the jaws in position on the pipe, a chain 15 is affixed at one end to a swivel 16 on one of the jaws, the links of which are adapted to be engaged between spaced lugs 17 on the other jaw. The swivel and lugs are preferably disposed near the ends of the jaws on the outer faces thereof.

In the operation of the invention, the jaws of the tongs are placed astride the pipe as shown in Fig. 2 with the shank extending in its central position and the chain drawn taut beneath the pipe and engaged by the lugs. When thus disposed the tongs may be freely shifted in any direction on the pipe. When it is desired to rotate the pipe in either direction the shank is swung to the side of its central position in the direction toward which the pipe is to be turned causing downward pressure to be exerted on the jaw beneath the shank and an upward pull on the other jaw. The teeth 13 on the downwardly pressed jaw and the teeth 14 on the other jaw will bite into and firmly grip the pipe by reason of the leverage exerted through the shank on pressure being applied thereto, whereupon the pipe may be turned in the desired direction. By retracting the shank, the teeth of the jaws will be relieved of pressure and the tongs moved to a new position. To reverse the direction of movement of the pipe the shank is swung to the opposite side of its central position thus not necessitating the removal of the tongs.

By connecting the outer ends of the jaws together, an upward pull on one of the jaws will effect a downward pull on the other jaw thus insuring engagement of the proper engagement of the teeth with the pipe.

I claim:

1. A pipe tong comprising a shank, a pair of oppositely curved arcuate jaws thereon arranged to nearly encompass a cylindrical pipe, a pair of oppositely inclined sets of gripping teeth on the inner arcuate faces of said jaws arranged to normally contact the surface of a pipe encircled by the jaws, means for detachably connecting the outer ends of the jaws together, and spaced pivot pins attaching the jaws to the shank on opposite sides thereof in such position that on rocking the shank in one direction diametrically opposite gripping teeth on the pair of jaws will grip the pipe while the other sets of teeth will be free to slide on the pipe, and when the shank is rocked in the opposite direction the action of the sets of teeth will be reversed.

2. A pipe tong comprising a shank, a pair of arcuate jaws thereon, opposed sets of ratchet teeth on each of said jaws, portions of the diametrically opposite sets of the teeth on the jaws adapted to grip a pipe to be turned one way or the other according to the direction of pull imposed on the shank, and means for connecting the outer ends of the jaws.

3. A pipe tong comprising a shank, a pair of opposed arcuate jaws thereon, a set of ratchet teeth on each of the jaws having their gripping edges extending toward the inner ends of the jaws, a second set of ratchet teeth on each of said jaws having their gripping edges extending toward the outer ends of the jaws, portions of both sets of teeth on each jaw adapted to contact a pipe disposed between the jaws, the opposed portions of the sets of teeth being adapted to alternately grip the pipe, and means for connecting the outer ends of the jaws around a pipe.

4. A pipe tong comprising a shank, a pair of arms, spaced pivot pins connecting the arms to the shank, arcuate jaws formed on said arms, opposed gripping teeth on each of said jaws, arranged to collectively contact the surface of a pipe encompassed by the jaws, and to grip the pipe according to the direction of pull exerted on the shank, and means for connecting the outer ends of the jaws together.

RALPH M. BRANDON.